(12) United States Patent
Lin et al.

(10) Patent No.: US 11,870,978 B2
(45) Date of Patent: *Jan. 9, 2024

(54) METHOD AND APPARATUS OF MATRIX BASED INTRA PREDICTION IN IMAGE AND VIDEO PROCESSING

(71) Applicant: HFI INNOVATION INC., Zhubei (TW)

(72) Inventors: Zhi-Yi Lin, Hsinchu (TW); Tzu-Der Chuang, Hsinchu (TW); Ching-Yeh Chen, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 56 days.

This patent is subject to a terminal disclaimer.

(21) Appl. No.: 17/737,568

(22) Filed: May 5, 2022

(65) Prior Publication Data

US 2022/0264088 A1    Aug. 18, 2022

Related U.S. Application Data

(63) Continuation of application No. 16/850,210, filed on Apr. 16, 2020, now Pat. No. 11,381,808.

(Continued)

(51) Int. Cl.
*H04N 19/105*  (2014.01)
*H04N 19/137*  (2014.01)
(Continued)

(52) U.S. Cl.
CPC ......... *H04N 19/105* (2014.11); *H04N 19/137* (2014.11); *H04N 19/176* (2014.11); *H04N 19/593* (2014.11)

(58) Field of Classification Search
CPC .... H04N 19/105; H04N 19/593; H04N 19/11; H04N 19/137; H04N 19/176; H04N 19/42
See application file for complete search history.

(56) References Cited

U.S. PATENT DOCUMENTS

2014/0198846 A1*  7/2014  Guo .................. H04N 19/59
                                                 375/240.12
2017/0310994 A1* 10/2017  Seo .................. H04N 19/176
(Continued)

OTHER PUBLICATIONS

Chinese language office action dated May 18, 2021, issued in application No. TW 109112963.
(Continued)

*Primary Examiner* — Dakshesh D Parikh
(74) *Attorney, Agent, or Firm* — Oblon, McClelland, Maier & Neustadt, L.L.P.

(57) ABSTRACT

An intra prediction method comprises receiving input data of a current block in a current picture, deriving reference samples of the current block from boundary samples, selecting a matrix for the current block, generating intermediate predicted samples by multiplying the reference samples and the matrix, and clipping the intermediate predicted samples before up-sampling. The intra prediction method further comprises performing an up-sampling process on the clipped intermediate predicted samples to generate predicted samples for the current block, and encoding or decoding the current block according to the predicted samples of the current block.

13 Claims, 6 Drawing Sheets

Related U.S. Application Data

(60) Provisional application No. 62/838,396, filed on Apr. 25, 2019.

(51) Int. Cl.
    *H04N 19/176*    (2014.01)
    *H04N 19/593*    (2014.01)

(56) References Cited

U.S. PATENT DOCUMENTS

| | | | | |
|---|---|---|---|---|
| 2020/0322620 A1* | 10/2020 | Zhao | .................... | H04N 19/44 |
| 2021/0297661 A1* | 9/2021 | Deng | .................. | H04N 19/105 |
| 2021/0314618 A1* | 10/2021 | Pfaff | ................... | H04N 19/176 |

OTHER PUBLICATIONS

Pfaff, J.,et al., "CE3: Affine linear weighted intraprediction," JointVideo Experts Team(JVET)of ITU-TSG 16WP3 and ISO/IEC JTC 1/SC 29/WG 11; Mar. 2019; pp. 1-17.

\* cited by examiner

METHOD AND APPARATUS OF MATRIX BASED INTRA PREDICTION IN IMAGE AND VIDEO PROCESSING

CROSS REFERENCE TO RELATED APPLICATIONS

The present application is a Continuation of U.S. application Ser. No. 16/850,210 filed Apr. 16, 2020, which claims priority to U.S. Provisional Patent Application. Ser. No. 62/838,396, filed on Apr. 25, 2019, entitled "Methods for Matrix based Intra Prediction," the entire contents of each of which are incorporated herein by reference.

FIELD OF THE INVENTION

The present invention relates to intra prediction in image and video processing. In particular, the present invention relates to matrix based intra prediction for generating intra predictors by matrix multiplication.

BACKGROUND AND RELATED ART

Intra prediction has been widely adopted in various image and video coding standard to process an initial picture or to periodically insert Intra coded picture (I-picture) or Intra coded blocks (I-blocks) for random access or for alleviation of error propagation. Intra prediction is usually designed to exploit spatial features in the image or video picture such as smooth area, vertical line or edge, horizontal line or edge, and diagonal line or edge. Intra prediction is also useful for regions with high motion or scene changes as intra prediction is more efficient than inter prediction for coding these regions. Intra prediction exploits the spatial correlation within a picture or within a picture region. For a block-based video coding standard, intra prediction for a current block is relied upon pixels in neighboring blocks that have been processed. For example, if blocks in a picture or picture region are sequentially processed row by row from top to bottom and from left to right, neighboring blocks on the top and neighboring blocks on the left of the current block can be used to form an intra predictor for pixels inside the current block.

Figure 1:
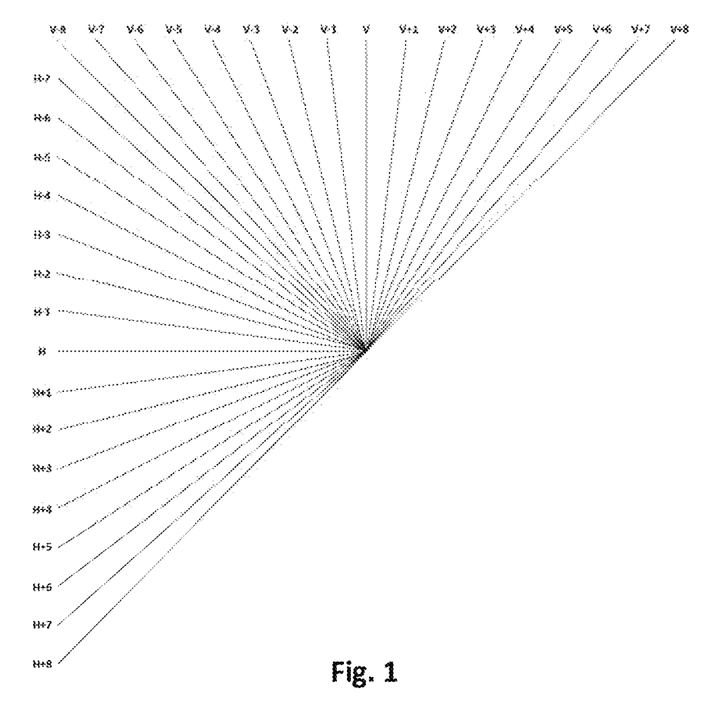
FIG. 1 illustrates 33 angular intra prediction modes supported in the HEVC standard.
Figure 2:
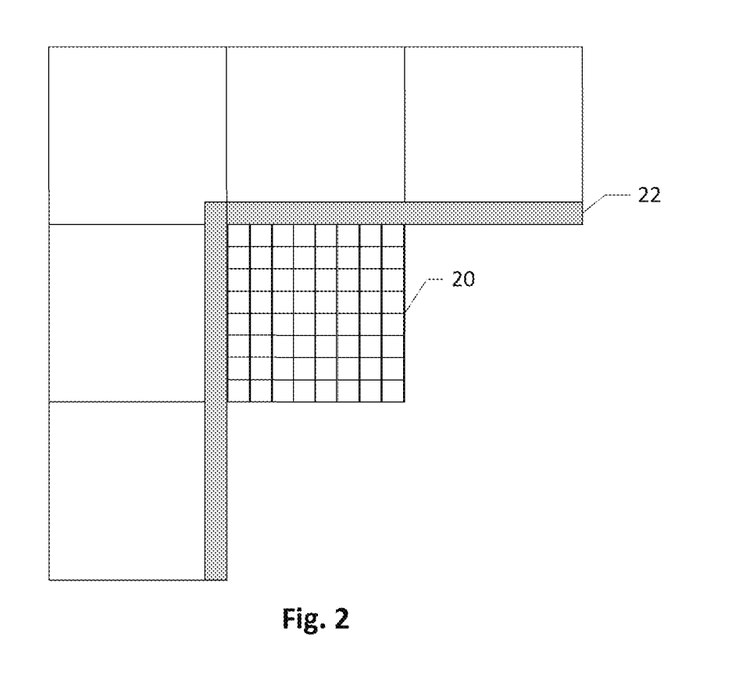
FIG. 2 illustrates exemplary reference samples filtered by an intra smoothing filter for deriving an intra predictor for a current block.

The High-Efficiency Video Coding (HEVC) standard supports 35 intra prediction modes including 33 angular modes, DC mode, and Planar mode. FIG. 1 illustrates the prediction directions for the 33 angular intra prediction modes of the HEVC standard, where H represents Horizontal direction mode and V represents Vertical direction mode. An intra predictor for a current block coded or to be coded by intra prediction of the HEVC standard is generated by three steps including intra smoothing filter, intra prediction, and intra gradient filter. FIG. 2 illustrates exemplary reference samples filtered by an intra smoothing filter for deriving an intra predictor for a current block. A smoothing operation is applied to reference samples 22 of the current block 20 before calculating the intra predictor for the current block 20. The smoothing operation reduces the discontinuities introduced by some of the intra prediction modes by applying the intra smoothing filter to the reference samples 22 in a left neighboring column and an above neighboring row of the current block 20. This smoothing operation is adaptively applied depending on an intra prediction mode and the size of the current block.

The second step is to derive the intra predictor from neighboring boundary samples according to one intra prediction mode selected from the 35 intra prediction modes supported by the HEVC standard. If an angular mode is selected, the value of each sample in the current block is predicted by extrapolating the samples from the neighboring boundary samples according to the prediction direction of the selected angular mode. The value of each sample in the current block is calculated assuming an amplitude surface with a horizontal and vertical smooth gradient derived from the neighboring boundaries samples of the neighboring blocks if Planar mode is selected. The value of each sample of the current block is an average of the neighboring boundary samples if DC mode is selected.

An intra gradient filter is applied to samples at the left and top boundaries of the current block in the third step if the Ultra prediction mode is DC, Horizontal, or Vertical mode. The concept of applying the intra gradient filter is to utilize the gradient information along the intra prediction direction to improve the quality of the intra predictor. The samples in the first row and first column of the current block are filtered by the intra gradient filter when the selected intra prediction mode is DC mode. The samples in the first row are filtered by the intra gradient filter when the selected intra prediction mode is Horizontal mode, and the samples in the first column are filtered by the intra gradient filter if the selected intra prediction mode is Vertical mode.

The selected intra prediction mode is signaled explicitly in the video bitstream or inferred from previously decoded modes of the above and left neighboring blocks of the current block. The intra prediction modes of the two neighboring blocks are included in a set of three Most Probable Modes (MPMs). A first MPM flag is signaled to indicate whether the selected mode is identical to one of the three MPMs, if so, a MPM index is sent to indicate which of the three MPMs is selected; if the first MPM flag is false, the selected mode is explicitly signaled using a 5-bit fixed length codeword.

Figure 3:
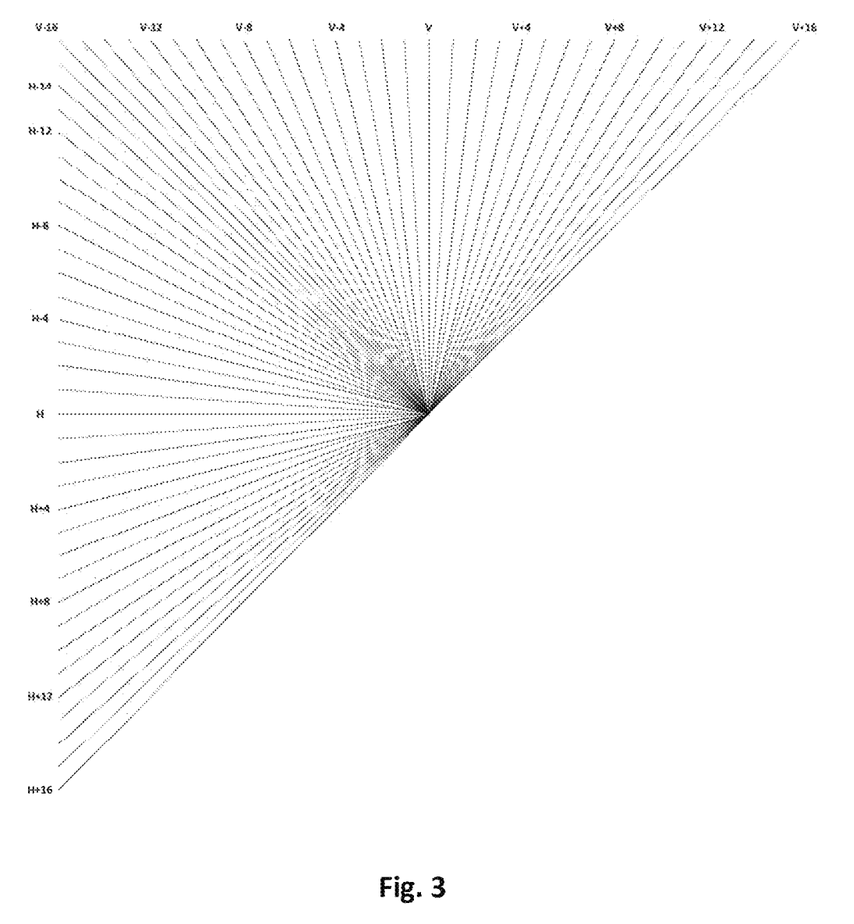
FIG. 3 illustrates an example of 65 angular intra prediction modes for regular intra prediction.

The 33 angular modes shown in FIG. 1 can be expanded to a general case with more or less angular modes, where each of the angular modes can be represented by mode H+k or mode V+k, where H represents the direction of Horizontal mode, V represents the direction of Vertical mode, and k=0, +−1, +−2, . . . +−K. An example of 65 angular modes for Ultra prediction is shown in FIG. 3, where k is ranged from −16 to 16, and mode H−16 and mode V−16 are the same mode as this mode refers to the prediction direction from an upper-left corner to the center of the current block. FIG. 3 illustrates the 65 angular intra prediction modes with additional 32 angular modes in between the original 33 angular modes supported by the HEVC standard as shown in FIG. 1. The 65 angular modes in FIG. 3 include modes H+16 to H−15 from bottom to top at the left boundary of the block and modes V−16 to V+16 from left to right at the upper boundary of the block.

In the up-coming video coding standard Versatile Video Coding (VVC), a Matrix based Intra Prediction (MIP) method is proposed for square and rectangular blocks. For predicting samples of a current block of a width equal to W and a height equal to H, the input of the MIP method includes one line of H reconstructed neighboring boundary samples located at the left of the current block and one line of W reconstructed neighboring boundary samples located at the above the current block. The MIP method generates a prediction signal of the current block based on the following six steps. In the first step, reference samples of the current block are prepared. For example, four samples out of the reconstructed neighboring boundary samples are extracted by averaging if W and H are both equal to 4; otherwise eight samples out of the reconstructed neighboring boundary samples are extracted by averaging. In the second step, a matrix is selected for the current block according to the block size and MIP mode index. In the third step, matrix vector multiplication, followed by addition of an offset vector, is carried out with the prepared reference samples as an input. The result is a reduced prediction signal on a sub-sampled set of samples in the current block. In the fourth step, the reduced prediction signal is modified by transposing if necessary. In the fifth step, the prediction signal at the remaining positions is generated from the reduced prediction signal on the sub-sampled set by up-sampling, for example, using linear interpolation which is a single step linear interpolation in each direction. Up-sampling is not required if the current block is a 4×4 block. In the sixth step, all prediction samples in the current block after up-sampling are clipped to a rational range.

The matrices and offset vectors used to generate the prediction signal are taken from three sets of matrices $S_0$, $S_1$, $S_2$. The first set $S_0$ consists of 18 matrices $A_0^i$, $i \in \{0, \ldots, 17\}$, each matrix has 16 rows and 4 columns, and 18 offset vectors $b_0^i$, $i \in \{0, \ldots, 17\}$, each offset vector has a size of 16. Matrices and offset vectors of the first set $S_0$ are used for blocks with size equal to 4×4. The second set $S_1$ consists of 10 matrices $A_1^i$, $i \in \{0, \ldots, 9\}$, each matrix has 16 rows and 8 columns, and 10 offset vectors $b_1^i$, $i \in \{0, \ldots, 9\}$, each offset vector has a size of 16. Matrices and offset vectors of the second set $S_1$ are used for blocks with sizes equal to 4×8, 8×4, and 8×8. Finally, the third set $S_2$ consists of 6 matrices $A_2^i$, $i \in \{0, \ldots, 5\}$, each matrix has 64 rows and 8 columns, and 6 offset vectors $b_2^i$, $i \in \{0, \ldots, 5\}$, each offset vector has a size of 64. Matrices and offset vectors of the third set $S_2$ or parts of these matrices and offset vectors are used for all blocks with other block sizes. The total number of multiplications required in the matrix computation is always smaller than or equal to 4×W×H. In other words, at most four multiplications per sample are required in the MIP method.

Preparing Reference Samples In the first step of the MIP method, the top input boundaries $bdry^{top}$ and the left input boundaries $bdry^{left}$ are used to generate reduced top boundaries $bdry_{red}^{top}$ and reduced left boundaries $bdry_{red}^{left}$. Here, $bdry_{red}^{top}$ and $bdry_{red}^{left}$ both consist of 2 samples in the case of a 4×4 block and both consist of 4 samples in all other cases. In the case of a 4×4 block, for $0 \leq i < 2$, the reduced top boundaries are defined as:

$$bdry_{red}^{top}[i] = \left(\left(\sum_{j=0}^{1} bdry^{top}[i \cdot 2 + j]\right) + 1\right) \gg 1$$

and the reduced left boundaries $bdry_{red}^{left}$ are defined analogously.

Otherwise, if the block-width W is given as $W = 4 \cdot 2^k$, for $0 \leq i < 4$, the reduced top boundaries are defines as:

$$bdry_{red}^{top}[i] = \left(\left(\sum_{j=0}^{2^k-1} bdry^{top}[i \cdot 2^k + j]\right) + (1 \ll (k-1))\right) \gg k$$

and the reduced left boundaries $bdry_{red}^{left}$ are defined analogously.

The two reduced boundaries $bdry_{red}^{top}$ and $bdry_{red}^{left}$ are concatenated to form a reduced boundary vector $bdry_{red}$. The reduced boundary vector has a size of 4 for any 4×4 block and the reduced boundary vector has a size of 8 for any of the other block sizes. If mode refers to the MIP-mode, for example, there are 35 MIP-modes in the first matrix set $S_0$, 19 MIP-modes in the second matrix set $S_1$, and 11 MIP-modes in the third matrix set $S_2$, this concatenation for the reduced boundary vector is defined as follows:

$$bdry_{red} = \begin{cases} [bdry_{red}^{top}, bdry_{red}^{left}] & \text{for } W = H = 4 \text{ and mode} < 18 \\ [bdry_{red}^{left}, bdry_{red}^{top}] & \text{for } W = H = 4 \text{ and mode} \geq 18 \\ [bdry_{red}^{top}, bdry_{red}^{left}] & \text{for } \max(W, H) = 8 \text{ and mode} < 10 \\ [bdry_{red}^{left}, bdry_{red}^{top}] & \text{for } \max(W, H) = 8 \text{ and mode} \geq 10 \\ [bdry_{red}^{top}, bdry_{red}^{left}] & \text{for } \max(W, H) > 8 \text{ and mode} < 6 \\ [bdry_{red}^{left}, bdry_{red}^{top}] & \text{for } \max(W, H) > 8 \text{ and mode} \geq 6. \end{cases}$$

Finally, for the interpolation of the sub-sampled prediction signal, a second version of the reduced boundaries is needed for large blocks. Namely, if $\min(W, H) > 8$ and $W \geq H$, one writes $W = 8 * 2^l$, and for $0 \leq i < 8$, the second version of the reduced boundaries is defined as:

$$bdry_{redII}^{top}[i] = \left(\left(\sum_{j=0}^{2^l-1} bdry^{top}[i \cdot 2^l + j]\right) + (1 \ll (l-1))\right) \gg l.$$

If $\min(W, H) > 8$ and $H > W$, the second version of the reduced boundaries $bdry_{redII}^{left}$ is defined analogously.

Generation of Reduced Prediction Signal by Matrix Vector Multiplication A reduced prediction signal $pred_{red}$ is generated by the reduced boundary vector, and this reduced prediction signal is a signal on the down-sampled block of width $W_{red}$ and height $H_{red}$. The width and height of the down-sampled block $W_{red}$ and $H_{red}$ are defined as:

$$W_{red} = \begin{cases} 4 & \text{for } \max(W, H) \leq 8 \\ \min(W, 8) & \text{for } \max(W, H) > 8 \end{cases}$$

$$H_{red} = \begin{cases} 4 & \text{for } \max(W, H) \leq 8 \\ \min(H, 8) & \text{for } \max(W, H) > 8 \end{cases}$$

The reduced prediction signal $pred_{red}$ is computed by calculating a matrix vector product and adding an offset:

$$pred_{red} = A \cdot bdry_{red} + b.$$

In the above equation, A is a matrix that has $W_{red} \cdot H_{red}$ rows and 4 columns if $W = H = 4$ and 8 columns in all other cases, and b is an offset vector of size $W_{red} \cdot H_{red}$. The matrix A and the vector b are taken from one of the sets $S_0$, $S_1$, $S_2$ as follows. An index $idx = idx(W, H)$ is defined as follows:

$$idx(W, H) = \begin{cases} 0 & \text{for } W = H = 4 \\ 1 & \text{for } \max(W, H) = 8 \\ 2 & \text{for } \max(W, H) > 8. \end{cases}$$

Moreover, one puts m as follows:

$$m = \begin{cases} \text{mode} & \text{for } W = H = 4 \text{ and mode} < 18 \\ \text{mode} - 17 & \text{for } W = H = 4 \text{ and mode} \geq 18 \\ \text{mode} & \text{for max}(W, H) = 8 \text{ and mode} < 10 \\ \text{mode} - 9 & \text{for max}(W, H) = 8 \text{ and mode} \geq 10 \\ \text{mode} & \text{for max}(W, H) > 8 \text{ and mode} < 6 \\ \text{mode} - 5 & \text{for max}(W, H) > 8 \text{ and mode} \geq 6. \end{cases}$$

If the index idx≤1 or idx=2 and min(W, H)>4, the matrix A and the vector b are defined as $A = A_{idx}^m$ and $b = b_{idx}^m$. In the case that idx=2 and min(W, H)=4, one lets A to be lie matrix that arises by leaving out every row of $A_{idx}^m$ that, in the case W=4, corresponds to an odd X-coordinate in the down-sampled block, or, in the case H=4, corresponds to an odd y-coordinate in the down-sampled block.

Finally, the reduced prediction signal $pred_{red}$ is replaced by its transpose in the following cases: W=H=4 and mode≥18, max(W, H)=8 and mode≥10, and max(W, H)>8 and mode≥6. The number of multiplications required for calculation of the reduced prediction signal is 4 in the case of W=H=4 since in this case. A has 4 columns and 16 rows. In all other cases, A has 8 columns and $W_{red} \cdot H_{red}$ rows and one immediately verifies that in these cases $8 \cdot W_{red} \cdot H_{red} \leq 4 \cdot W \cdot H$ multiplications are required. In other words, at most 4 multiplications per sample are required to compute the reduced prediction signal $pred_{red}$.

Single Step Linear Interpolation For a current block with at least a width W and height H larger than or equal to 8, a prediction signal for the current block is arise from the reduced prediction signal $pred_{red}$ on $W_{red} \times H_{red}$ by linear interpolation. Depending on the block shape, linear interpolation is performed in vertical, horizontal or both directions. In cases when linear interpolation is applied in both directions, the horizontal direction is first applied if W<H, otherwise the vertical direction is first applied.

Consider without loss of generality a current block with at least a width W and height H larger than or equal to 8 and the width W is larger than or equal to the height H, the one-dimensional linear interpolation is performed as follows. Without loss of generality, it suffices to describe linear interpolation in the vertical direction. First, the reduced prediction signal is extended to the top by the boundary signal. The vertical up-sampling factor is defined as: $U_{ver} = H/H_{red}$ and $U_{ver} = 2^{u_{ver}} \geq 1$. The extended reduced prediction signal is then defined by:

$$pred_{red}[x][-1] = \begin{cases} bdry_{red}^{top}[x] & \text{for } W = 8 \\ bdry_{red11}^{top}[x] & \text{for } W > 8. \end{cases}$$

Based on this extended reduced prediction signal, the vertically linear interpolated prediction signal is generated by:

$$pred_{red}^{ups,ver}[x][U_{ver} \cdot y + k] =$$

$$\left( (U_{ver} - k - 1) \cdot pred_{red}[x][y-1] + (k+1) \cdot pred_{red}[x][y] + \frac{U_{ver}}{2} \right) \gg u_{ver}$$

for $0 \leq x < W_{red}$, $0 \leq y < H_{red}$ and $0 \leq k < U_{ver}$.

After up-sampling by linear interpolation, a clipping process is applied to the up-sampled values of the prediction signal to clip all values within a rational range.

BRIEF SUMMARY OF THE INVENTION

A method and apparatus for processing image or video data by matrix based intra prediction in an image or video coding system are disclosed. Embodiments of an image or video coding system receive input data associated with a current block to be processed by matrix based intra prediction in a current picture, derive reference samples of the current block from neighboring boundary samples, select a matrix, and generate intermediate predicted samples by multiplying the reference samples and the selected matrix. The image or video coding system further clips the intermediate predicted samples to a rational range, performs an up-sampling process on the clipped intermediate predicted samples to generate predicted samples for the current block, and encodes or decodes the current block according to the predicted samples of the current block.

In an embodiment, the rational range is [0, 1<<BitDepth−1], where BitDepth is an internal bit depth of the video coding system. The step of deriving reference samples of the current block comprises down-sampling the neighboring boundary samples of the current block to generate the reference samples. For example, the reference samples are extracted by averaging the neighboring boundary samples of the current block. In some embodiments, the intermediate predicted samples are generated by adding an offset vector after multiplying the reference samples with the matrix.

In an exemplary video encoder, a matrix index is signaled in a video bitstream to indicate the matrix selected according to a width and height of the current block. In an exemplary video decoder, the matrix is selected by parsing a matrix index from a video bitstream and according to a width and height of the current block.

The up-sampling process up-samples the clipped intermediate predicted samples to a size of the current block. In one embodiment, the up-sampling process performs vertical up-sampling then horizontal up-sampling if a height of the current block is smaller than or equal to a width of the current block, otherwise horizontal up-sampling is performed before vertical up-sampling. The up-sampling process comprises up-sampling by linear interpolation in each direction according to some embodiment of the present invention.

The image or video processing method further comprises adaptively performing a transposing process to the clipped intermediate samples of the current block before the up-sampling process.

Aspects of the disclosure further provide an apparatus in the image or video coding system for compression image or video data by matrix based intra prediction. Embodiments of the apparatus performs a dipping process on intermediate predicted samples of a current block generated by matrix multiplication, then the apparatus performs an up-sampling process on the clipped intermediate predicted samples to generate an intra predictor for the current block.

Aspects of the disclosure further provide a non-transitory computer readable medium storing program instructions for causing a processing circuit of an apparatus to perform a matrix based intra prediction method for image or video processing. In the matrix based intra prediction method, a clipping process is performed before an up-sampling process in order to reduce the number of clippings required in matrix based intra prediction. Another advantage of performing clipping before up-sampling is it requires no additional buffer for up-sampling. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Figure 6:
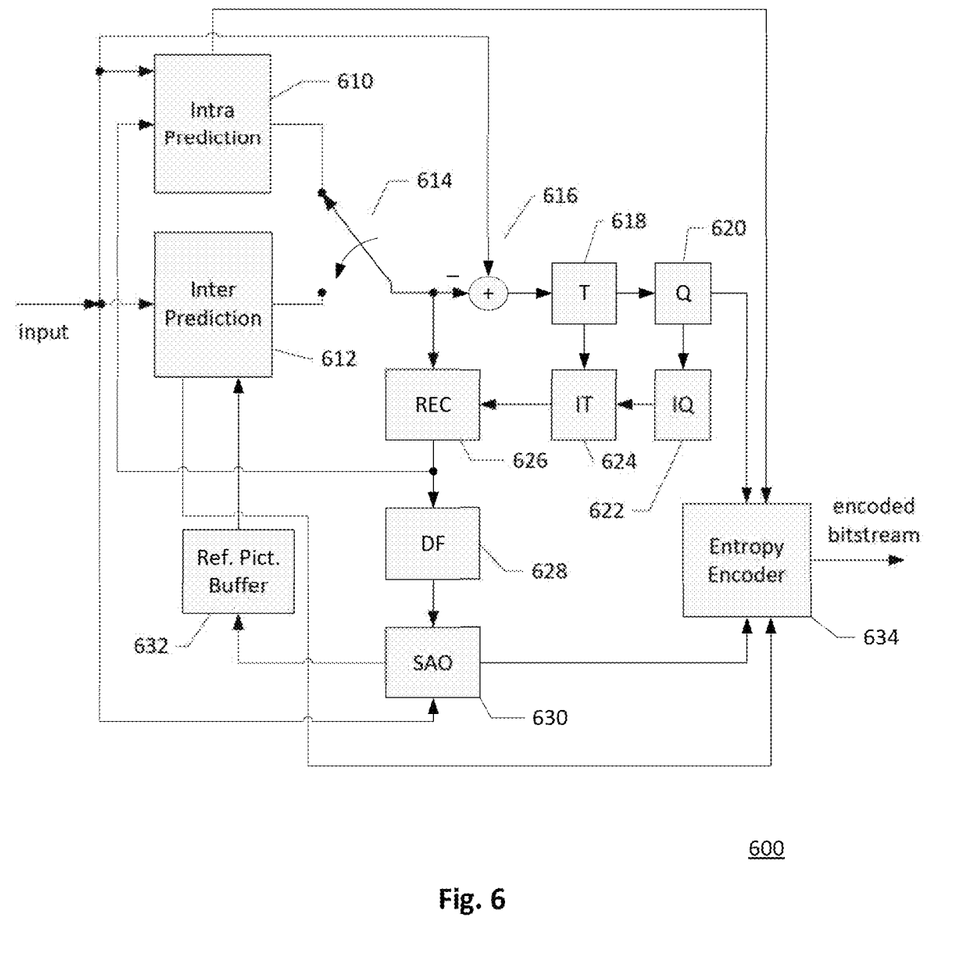
FIG. 6 illustrates an exemplary system block diagram for a video encoding system incorporating the intra prediction method according to embodiments of the present invention.
Figure 7:
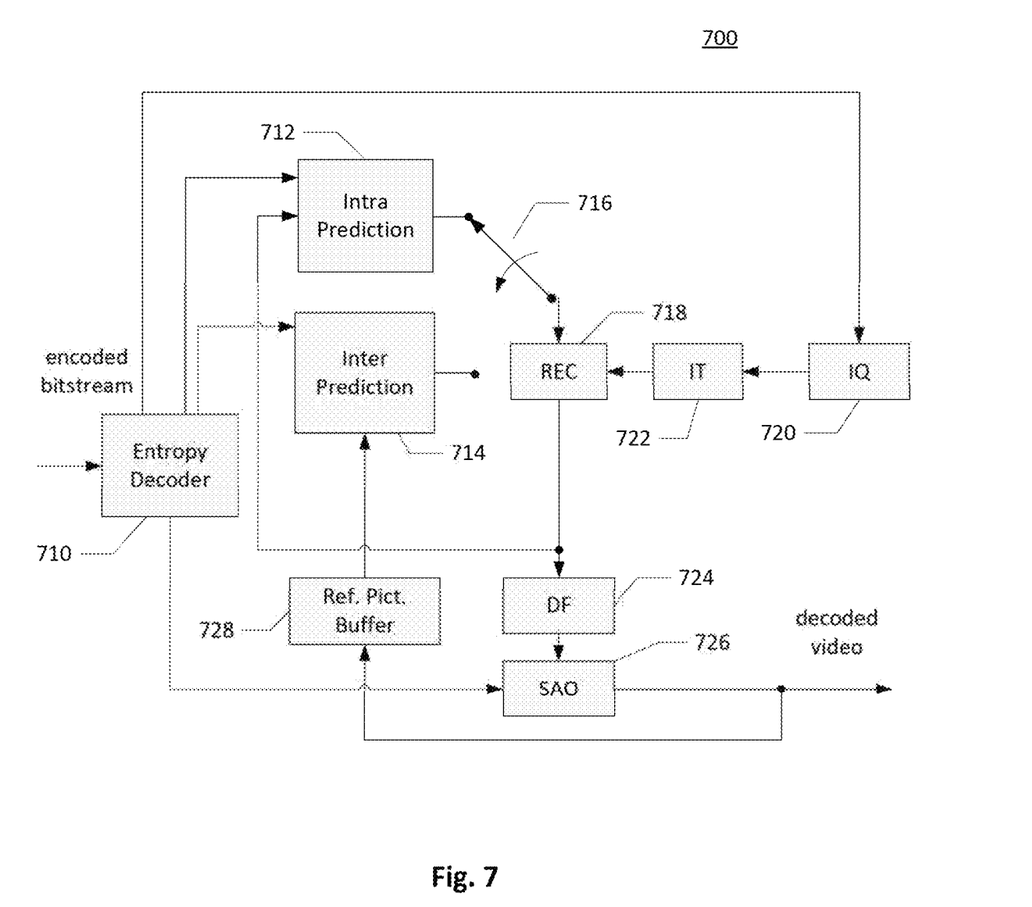
FIG. 7 illustrates an exemplary system block diagram for a video decoding system incorporating the intra prediction method according to embodiments of the present invention.

In this disclosure, the present application describes various image or video processing methods for reducing computational complexity of processing image or video blocks coded in matrix based intra prediction. An exemplary video encoder and decoder implementing one or a combination of the video processing methods are illustrated in FIGS. 6 and 7 respectively. Systems and methods described herein are organized in sections as follows. The section "Sample Clipping Before Up-Sampling" demonstrates exemplary methods of performing a clipping process before up-sampling in the MIP method. The section "Sampling Clipping Applied to Reconstructed Samples" describes exemplary methods of performing a clipping process after adding residuals to the predicted samples generated by the MIP method. The section "Representative Flowcharts of Exemplary Embodiments" together with FIG. 5 describes an exemplary image or video processing method utilizing a representative flowchart. The section "Video Encoder and Decoder Implementation" together with FIGS. 6 and 7 illustrate a video encoding system and a video decoding system incorporating one or a combination of the described video processing methods.

Sample Clipping Before Up-Sampling In the Matrix based Intra Prediction (MIP) method, neighboring boundary samples along the boundary of a current block are firstly down-sampled to generate reference samples, and a matrix is selected to multiply with the reference samples. For example, the reference samples are extracted by averaging the neighboring boundary samples of the current block. The matrix is selected by the video encoder according to a width and height of the current block. For example, the matrix is selected from a set of 16 matrices if the block size of the current block is 4×4, or the matrix is selected from a set of 8 matrices if the block size is 4×8, 8×4, 8×8, 4×N, or N×4, where N is a positive integer, otherwise, the matrix is selected from a set of 6 matrices. A matrix index indicating the selected matrix is signaled in a video bitstream to the video decoder. In some embodiments, an offset vector is added after multiplying the reference samples and the selected matrix. The offset vector has a size of 16 if the block size of the current block is 4×4, 4×8, 8×4, 8×8, 4×N, or N×4, otherwise the offset vector has a size of 64. The resulting values are intermediate predicted samples with reduced width and height. The number of intermediate predicted samples for a current block is less than the size of the current block except for 4×4 blocks. For example, an 8×8 block has only 16 intermediate predicted samples. In the conventional MIP design, these intermediate predicted samples are directly passed to an up-sampling process, which up-samples the intermediate predicted samples to the size of the current block. Since the values resulting from the matrix multiplication can be negative values or positive values, embodiments of the present invention clip each intermediate predicted sample to a rational range before up-sampling. An example of the rational range is [0, 1<<bitDepth−1], where bitDepth is an internal bit depth of the video coding system. The buffer size required for storing each clipped sample before up-sampling is equal to bitDepth in this example. A transposing process is adaptively performed to the clipped intermediate samples of the current block before an up-sampling process. For example, a matrix index is signaled in the video bitstream to indicate which matrix is used and whether to apply transposing before up-sampling, and the decoder adaptively reorganizes the clipped intermediate samples according the flag. The clipped intermediate predicted samples are up-sampled by an up-sampling process according to embodiments of the present invention. In an embodiment of the up-sampling process, the up-sampling process performs vertical up-sampling then horizontal up-sampling if the height of the current block is smaller than or equal to the width of the current block, otherwise horizontal up-sampling is performed before vertical up-sampling. A linear interpolation filter is used to up-sample the clipped intermediate predicted samples.

For each block coded by the conventional MIP method, a worse case of a number of clippings is MAX_MIP_W× MAX_MIP_H samples need to be clipped. Since the up-sampling process in the conventional MIP method uses unclipped samples, for each sample, the bit depth of each entry of the buffer for storing the unclipped sample is larger than the internal bit depth of the video coding system bitDepth. For example, the buffer size for storing each unclipped sample needs two additional bits compared to bitDepth. MAX_MIP_W and MAX_MIP_H are the maximum block width and maximum block height of blocks coded by the MIP method respectively. For example, both MAX_MIP_W and MAX_MIP_H are equal to 64.

Figure 4A:
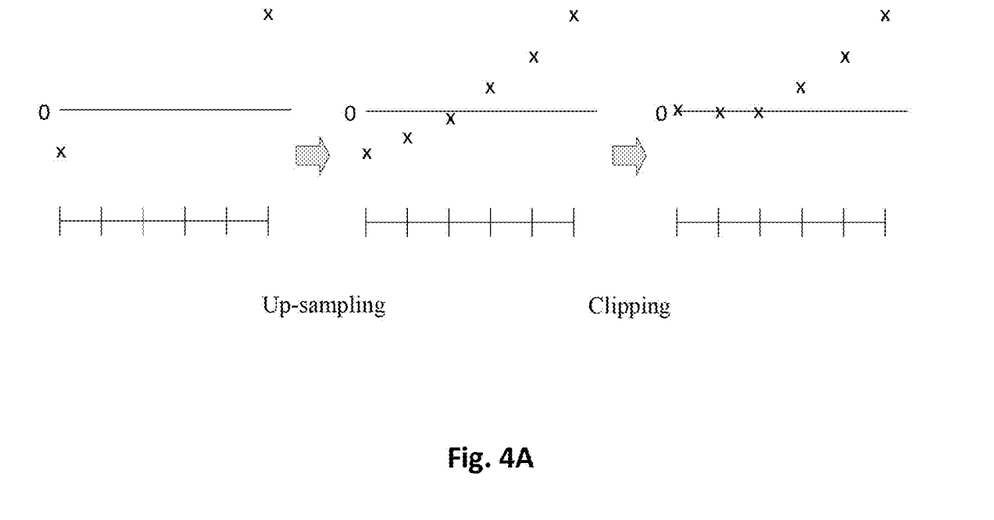
FIG. 4A demonstrates an example of applying up sampling before clipping in the MIP method according to a conventional design.
Figure 4B:
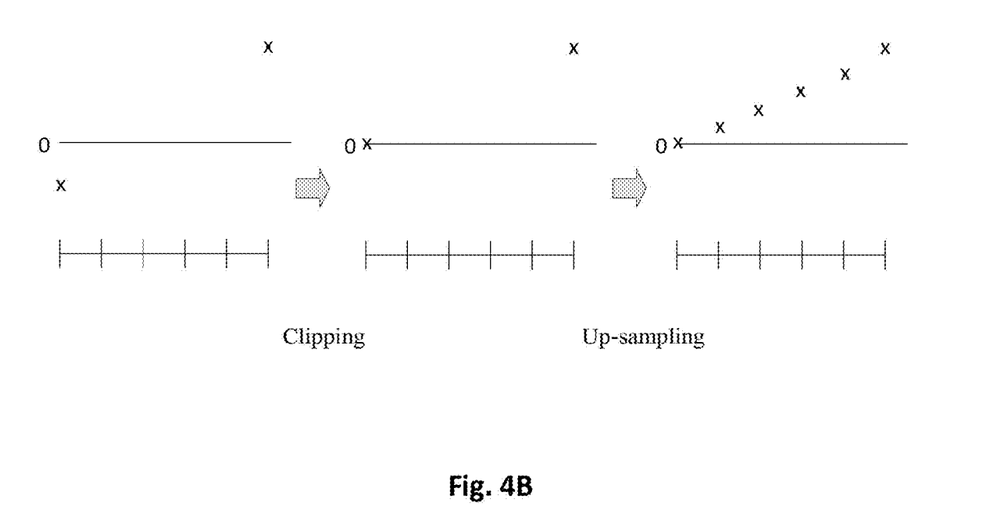
FIG. 4B demonstrates an example of applying dipping before up-sampling in the MIP method according to an embodiment of the present invention.

Embodiments of the MIP method perform a clipping process on intermediate predicted samples of a current block before up-sampling these intermediate predicted samples to the size of the current block. The benefits of changing the order of the clipping process in the MIP method to a time before the up-sampling process include reducing the number of sample clippings and reducing the buffer size. In the conventional MIP method, a worst case number of sample clippings for a MIP coded block is 4096 (i.e. 64×64) as the maximum size of MIP coded blocks is 64×64 samples. In contrast, a worst case number of sample clippings for a MIP coded block is reduced to 64 according to the embodiments of the present invention as the maximum number of intermediate prediction samples for a MIP coded block is 64. The worst case number of sample clippings is only 1/64 of the conventional design. Moreover, performing up-sampling on sample values already clipped in the appropriate range is more reasonable. FIG. 4A demonstrates an example of performing a clipping process after up-sampling according to the conventional MIP design. FIG. 4B demonstrates an example of performing a clipping process before up-sampling according to an embodiment of the present invention. In these two examples, two source samples generated from matrix multiplication are −10 and 40, and these two source samples are the input of a bi-linear up-sampling process in FIG. 4A. After applying the bi-linear up-sampling process, some of the resulting up-sampled samples are negative and some are positive. As shown in FIG. 4A, after applying the clipping process to the resulting up-sampled samples, all samples with negative values are clipped to 0. In this example, a sample value changes from multiple consecutive zeros to a positive value. The required additional buffer for storing the intermediate predicted samples for up-sampling is (12+1) bits*64. According to an embodiment of the present invention, the two source samples are first clipped to a range of [0, 1<<bitDepth−1], so the source sample with a value equal to −10 is clipped to 0 in the clipping process. These two clipped samples 0 and 40 are the input of a bi-linear up-sampling process, and the resulting up-sampled samples are all positive, gradually from 0 to 40 as shown in FIG. 4B.

If bi-linear filtering is used as the up-sampling filter and all inputs of the up-sampling filter are clipped in a rational range, such as [0, 1<<bitDepth−1], the output samples of the sub-sampling filter are always in the rational range. A clipping process for clipping the output samples of the up-sampling filter in the conventional design is therefore skipped. The buffer of each sample can also be reduced to bitDepth bits.

Some embodiments of the present invention only apply the MIP method to the luminance (luma) component. The MIP method cannot be used to predict corresponding chrominance (chroma) components.

Sampling Clipping Applied to Reconstructed Samples In another embodiment of the present invention, the sample clipping process is not applied straight after the up-sampling process in the MIP method, but is applied after adding residuals to the prediction samples. In other words, the sample clipping process is applied to reconstructed samples of the current block, where the reconstructed samples are the summation of the prediction samples and the residuals. According to this embodiment, each sample only needs to be clipped once instead of twice.

Figure 5:
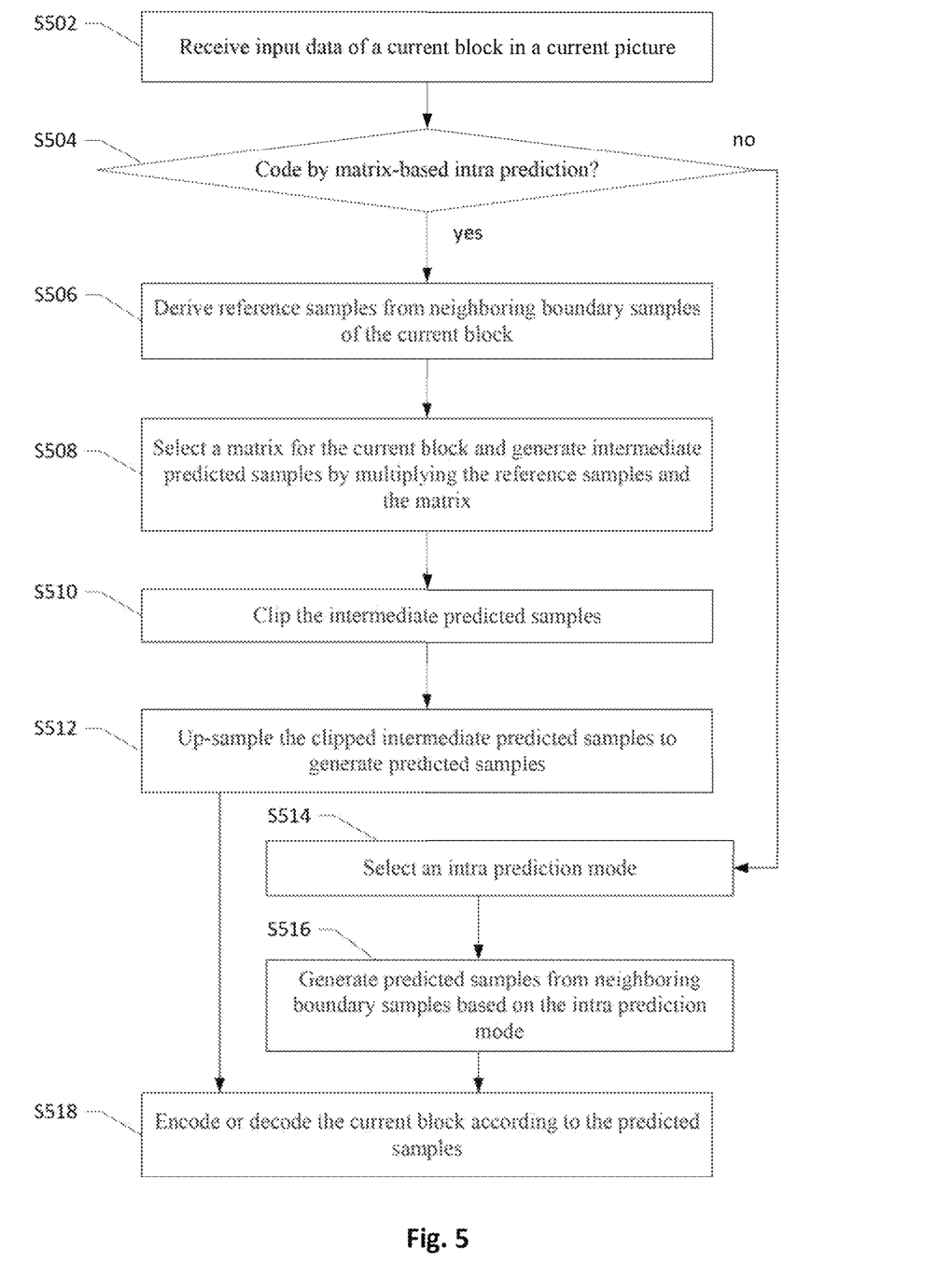
FIG. 5 is a flowchart illustrating an exemplary image or video processing method for encoding or decoding a current block coded or to be coded by MIP according to an embodiment of the present invention.

Representative Flowchart of Exemplary Embodiment FIG. 5 is a flowchart illustrating an exemplary method for processing a current block in a current picture by matrix based intra prediction according to an embodiment of the present invention. An image or video encoder or decoder receives input data associated with the current block coded or to be coded by intra prediction in step S502, and determines if the current block is coded or to be coded by matrix based intra prediction in step S504. If matrix based intra prediction is selected for the current block, reference samples are derived from neighboring boundary samples of the current block in step S506, and a matrix is selected for the current block in step S508. For example, the matrix is selected according to a width and height of the current block in the image or video encoder, and a matrix index of the selected matrix is signaled in a video bitstream. The image or video decoder parses the matrix index from the video bitstream and selects the same matrix according to the matrix index. The image or video encoder or decoder also generates intermediate predicted samples by multiplying the reference samples of the current block and the selected matrix in step S508. In step S510, the intermediate predicted samples are clipped to a rational range before up-sampling. An up-sampling process is performed in step S512 to generate predicted samples for the current block. If regular intra prediction is selected for the current block, the image or video encoder or decoder selects an intra prediction mode in step S514, and generates predicted samples for the current block from neighboring boundary samples based on the intra prediction mode in step S516. In step S518, the current block is encoded or decoded according to the predicted samples generated by either step S512 or step S516.

Video Encoder and Decoder Implementations The foregoing proposed image or video processing methods can be implemented in video encoders or decoders. For example, a proposed image or video processing method is implemented in an intra prediction module of an encoder, and/or an intra prediction module of a decoder. Alternatively, any of the proposed methods is implemented as a circuit coupled to the intra prediction module of the encoder and/or the intra prediction module of the decoder, so as to provide information needed by the intra prediction module.

FIG. 6 illustrates an exemplary system block diagram for a Video Encoder 600 implementing a video processing method of the present invention. For a current block to be coded by intra prediction, intra Prediction module 610 selects a prediction method for the current block from one of matrix based intra prediction and regular intra prediction. Intra Prediction module 610 generates predicted samples for the current block, which is also referred to as an intra predictor for the current block, based on reconstructed video data of a current picture. In various embodiments of the present invention, if the current block is predicted by matrix based intra prediction, reference samples of the current block are derived from boundary samples and then multiplied by a matrix to generate intermediate predicted samples. Intra Prediction module 610 clips intermediate predicted samples to a rational range and up-samples clipped intermediate predicted samples to generate predicted samples for the current block. For example, the rational range is [0, 1<<BitDepth−1], and a bi-linear interpolation filter is used for up-sampling. If regular intra prediction is selected, Intra Prediction module 610 selects an intra prediction mode for the current block and generates predicted samples for the current block according to the intra prediction mode. Inter Prediction module 612 performs illation estimation (ME) and motion compensation (MC) to provide inter predictors based on video data from other picture or pictures. For each block, either Intra Prediction module 610 or Inter Prediction module 612 supplies the selected predictor to Adder 616 to form prediction errors, also called prediction residues.

The prediction residues of the current block are further processed by Transformation module (T) 618 followed by Quantization module (Q) 620. The transformed and quantized residual signal is then encoded by Entropy Encoder 634 to form an encoded video bitstream. The encoded video bitstream is then packed with side information. The transformed and quantized residual signal of the current block is processed by Inverse Quantization module (IQ) 622 and Inverse Transformation module (IT) 624 to recover the prediction residues. As shown in FIG. 6, the prediction residues are recovered by adding back to the selected predictor at Reconstruction module (REC) 626 to produce reconstructed video data. The reconstructed video data may be stored in Reference Picture Buffer (Ref. Pict. Buffer) 632 and used for prediction of other pictures. The reconstructed Video data from REC 626 may be subject to various impairments due to the encoding processing, consequently, in-loop processing Deblocking Filter (DF) 628 and Sample Adaptive Offset (SAO) 630 are applied to the reconstructed video data before storing in the Reference Picture Buffer 632 to further enhance picture quality. Syntax associated with information for the in-loop processing DF 628 and SAO 630 are provided to Entropy Encoder 634 for incorporation into the encoded video bitstream.

An exemplary corresponding Video Decoder 700 for decoding data encoded by Video Encoder 600 of FIG. 6 is shown in FIG. 7. The encoded video bitstream is the input to Video Decoder 700 and is decoded by Entropy Decoder 710 to parse and recover the transformed and quantized residual signal and other system information. The decoding process of Decoder 700 is similar to the reconstruction loop at Encoder 600, except Decoder 700 only requires motion compensation prediction in inter Prediction module 714. Each block is decoded by either Intra Prediction module 712 or Inter Prediction module 714. Switch 716 selects an intra predictor from Intra Prediction module 712 or inter predictor from Inter Prediction module 714 according to decoded mode information of a current block. Intra Prediction module 712 decodes a flag indicating whether the current block is coded in matrix based intra prediction, and if the current block is coded in matrix based intra prediction, reference samples are derived from neighboring boundary samples and multiplied by a matrix to generate intermediate predicted samples. The matrix is selected according to a matrix index parsed from the encoded video bitstream. Intra Prediction module 712 clips the intermediate predicted samples then performs an up-sampling process on the clipped intermediate predicted samples to generate an intra predictor for the current block according to an embodiment of the present invention. Intra Prediction module 712 derives an intra predictor for the current block according to an intra prediction mode if the current block is not coded by matrix based intra prediction. The transformed and quantized residual signal associated with each block is recovered by inverse Quantization module (IQ) 720 and Inverse Transformation module (IT) 722. The recovered transformed and quantized residual signal is reconstructed by adding back the Intra or Inter predictor in REC 718 to produce reconstructed video. The reconstructed video is further processed by DF 724 and SAO 726 to generate final decoded video. If the currently decoded picture is a reference picture, the reconstructed video of the currently decoded picture is also stored in Ref. Pict. Buffer 728 for later pictures in decoding order.

Various components of Video Encoder 600 and Video Decoder 700 in FIG. 6 and FIG. 7 may be implemented by hardware components, one or more processors configured to execute program instructions stored in a memory, or a combination of hardware and processor. For example, a processor executes program instructions to control clipping intermediate predicted samples before up-sampling. The processor is equipped with a single or multiple processing cores. In some examples, the processor executes program instructions to perform functions in some components in Encoder 600 and Decoder 700, and the memory electrically coupled with the processor is used to store the program instructions, information corresponding to the reconstructed images of blocks, and/or intermediate data during the encoding or decoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above. As shown in FIGS. 6 and 7, Encoder 600 and Decoder 700 may be implemented in the same electronic device, so various functional components of Encoder 600 and Decoder 700 may be shared or reused if implemented in the same electronic device. For example, one or more of Reconstruction module 626, Inverse Transformation module 624, Inverse Quantization module 622, Deblocking Filter 628, Sample Adaptive Offset 630, and Reference Picture Buffer 632 in FIG. 6 may also be used to function as Reconstruction module 718, Inverse Transformation module 722, Inverse Quantization module 720, Deblocking Filter 724, Sample Adaptive Offset 726, and Reference Picture Buffer 728 in FIG. 7, respectively.

Embodiments of the matrix based intra prediction method for image or video coding system may be implemented in a circuit integrated into a video compression chip or program code integrated into video compression software to perform the processing described above. For examples, clipping intermediate predicted samples before up-sampling in the MIP method may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The invention may be embodied in other specific forms without departing from its spirit or essential characteristics. The described examples are to be considered in all respects only as illustrative and not restrictive. The scope a the invention is therefore, indicated by the appended claims rather than by the foregoing description. All changes which come within the meaning and range of equivalency of the claims are to be embraced within their scope.

What is claimed is:

1. A method of image or video coding, comprising:
receiving input data associated with a current block in a current picture, the current block having a size other than 4×4;
deriving reference samples of the current block from neighboring samples of the current block;
selecting a matrix for the current block;
generating intermediate predicted samples according to the reference samples and the matrix;
generating clipped intermediate predicted samples by clipping the intermediate predicted samples;
performing as up-sampling process on the clipped intermediate predicted samples to generate final predicted samples for the current block; and
encoding or decoding the current block in the current picture according to the final predicted samples of the current block,
wherein a number of clipping operations performed for producing the final predicted samples for the current block is less than a sample number of the current block.

2. The method of claim 1, wherein the step of generating clipped intermediate predicted samples comprises clipping the intermediate predicted samples to a rational range of [0, 1<<BitDepth−1], and BitDepth is an internal bit depth of the video coding system.

3. The method of claim 1, wherein the step of deriving reference samples of the current block comprises down-sampling the neighboring samples of the current block to generate the reference samples.

4. The method of claim 1, wherein the step of deriving reference samples of the current block comprises extracting the reference samples by averaging the neighboring samples of the current block.

5. The method of claim 1, wherein the step of generating intermediate predicted samples comprises generating the intermediate predicted samples by multiplying the reference samples and the matrix, and then adding an offset vector after multiplying the reference samples and the matrix.

6. The method of claim 1, further comprising signaling a matrix index in a video bitstream, wherein the matrix index indicates the matrix selected according to a width and height of the current block.

7. The method of claim 1, wherein the matrix is selected by parsing a matrix index from a video bitstream and according to a width and height of the current block.

8. The method of claim 1, wherein the up-sampling process up-samples the clipped intermediate predicted samples to a size of the current block.

9. The method of claim 1, wherein the up-sampling process performs vertical up-sampling then horizontal up-sampling if a height of the current block is smaller than or equal to a width of the current block, otherwise horizontal up-sampling is performed before vertical up-sampling.

10. The method of claim 1, wherein the up-sampling process comprises up-sampling by linear interpolation in each direction.

11. The method of claim 1, further comprising adaptively performing a transposing process to the clipped intermediate predicted samples of the current block before the up-sampling process.

12. An apparatus, comprising a computer processor configured for:
receiving input data associated with a current block in a current picture, the current block having a size other than 4×4;
deriving reference samples of the current block from neighboring samples of the current block;
selecting a matrix for the current block;
generating intermediate predicted samples according to the reference samples and the matrix;
generating clipped intermediate predicted samples by clipping the intermediate predicted samples;
performing an up-sampling process on the clipped intermediate predicted samples to generate final predicted samples for the current block; and
encoding or decoding the current block in the current picture according to the final predicted samples of the current block,
wherein a number of clipping operations performed for producing the final predicted samples for the current block is less than a sample number of the current block.

13. A non-transitory computer readable medium storing program instruction causing a processing circuit of an apparatus to perform a method of image or video coding, and the method comprising:
receiving input data associated with a current block in a current picture, the current block having a size other than 4×4;
deriving reference samples of the current block from neighboring samples of the current block;
selecting a matrix for the current block;
generating intermediate predicted samples according to the reference samples and the matrix;
generating clipped intermediate predicted samples by clipping the intermediate predicted samples;
performing an up-sampling process on the clipped intermediate predicted samples to generate final predicted samples for the current block; and
encoding or decoding the current block in the current picture according to the final predicted samples of the current block,
wherein a number of clipping operations performed for producing the final predicted samples for the current block is less than a sample number of the current block.

* * * * *